(12) United States Patent
Grimsrud et al.

(10) Patent No.: US 6,917,992 B2
(45) Date of Patent: Jul. 12, 2005

(54) METHOD AND APPARATUS FOR EFFICIENT COMMAND QUEUING WITHIN A SERIAL ATA ENVIRONMENT

(75) Inventors: Knut S. Grimsrud, Forest Grove, OR (US); Amber D. Huffman, Banks, OR (US); Robert J. Royer, Jr., Portland, OR (US)

(73) Assignee: Intel Corporation, Santa Clara, CA (US)

( * ) Notice: Subject to any disclaimer, the term of this patent is extended or adjusted under 35 U.S.C. 154(b) by 151 days.

(21) Appl. No.: 10/261,755

(22) Filed: Sep. 30, 2002

(65) Prior Publication Data

US 2004/0073719 A1 Apr. 15, 2004

(51) Int. Cl.⁷ .............................................. G06F 13/12
(52) U.S. Cl. ......................................... 710/74; 710/33
(58) Field of Search ............................... 710/5, 33, 52, 710/74; 711/151

(56) References Cited

U.S. PATENT DOCUMENTS 6,567,862 B1 * 5/2003 Saito ............................ 710/5
2003/0236952 A1 * 12/2003 Grieff et al. ................. 711/151

OTHER PUBLICATIONS http://www.seagate.com/support/disc/manuals/sata/sata_im.pdf, "Serial ATA: High Speed Seralized AT Attachment", Revision 1.0, Aug. 29, 2001, Coversheet, Table of Contents and Table of Figures, 10 pages, Sections 4.1.12, 4.1.13, 4.1.14 and 4.1.15 (p. 15), Section 5.2.1 pp. 26–27, Section 5.2.3, pp. 29–32.

Intel, "Application Notes, : Serial ATA II Native Command Queuing Overview", Apr. 2003, Section 2.0 to 2.1, pp. 6–7 with Coversheets , (4 pages).

Bill Colson, " Serial ATA: AN Evolutionary Transition,", Intel Developer UPDATEMagazine, Aug. 2000, pp. 1–6.

Jeffrey Ravencraft, Serial ATA: the Long–term Solution For Storage Connectivity, Intel UPDATEMagazine, Mar. 2001, pp. 1–5.

http://www.serialata.org, Michael Alexenko, "Maxtor Presentation, ATA for the Enterprise: The present and Future State of ATA", Feb. 21, 2001, coversheet plus 15 pages.

http://www.serialata.org, "Maxtor Presentation, Serial ATA in Servers and Networked Storage" Mar. 2002, pp. 1–11.

Silicon Image, "Implementing Serial ATA Technology", White Pages, Presented by WinHEC, Mar. 22, 2002, 8 pages.

* cited by examiner

*Primary Examiner*—Jeffrey Gaffin
*Assistant Examiner*—Harold Kim
(74) *Attorney, Agent, or Firm*—Blakely, Sokoloff, Taylor & Zafman LLP

(57) ABSTRACT

A method is described that involves sending a second command over a Serial ATA interface to a device before the device is able to execute a first command that was previously sent to the Serial ATA interface. In a further embodiment of the first command is tagged with a first reference number. In an even further embodiment of the method the second command is tagged with a second reference number.

42 Claims, 3 Drawing Sheets

METHOD AND APPARATUS FOR EFFICIENT COMMAND QUEUING WITHIN A SERIAL ATA ENVIRONMENT

FIELD OF INVENTION

The field of invention relates generally to computing systems architecture; and, more specifically, to a method and apparatus for efficient command queuing within a Serial ATA environment.

BACKGROUND

FIG. 1 shows a generic architecture for a computing system 100. The computing system of FIG. 1 includes a Central Processing Unit 102 which includes a processing core 102a (e.g., a microprocessor or group of microprocessors) that executes instructions in order to realize software routines; and, a memory 102b where the instructions (and related data) are stored. The computing system also makes use of other peripheral devices such as, for example, non volatile data storage devices (e.g., magnetic disk drive, CD ROM drive, tape drive, etc.), a networking interface, a keyboard, etc. According to the computing system architecture presented in FIG. 1, the peripheral devices can send/receive data from the CPU 102 by use of a system bus 103 (e.g., a Peripheral Components Interface (PCI) bus).

Here, a system bus 103 is used to propagate data between the CPU 102 and a number of different computing system peripheral devices. Typically, the different peripheral components "hang" off of the system bus 103 (or have a communication path that flows through a component that hangs off of the system bus 103). For example, a first device (e.g., a networking interface) may communicate to the CPU through system bus interface 106, a second device (e.g., a keyboard) may communicate to the CPU through system bus interface 105; a third device (e.g., non volatile storage device 109) may communicate to the CPU through system bus interface 104.

Note that the computing system architecture 100 of FIG. 1 may take on various forms. For example, according to a first embodiment, the entire computing system 100 is viewed as being within a single "box" or packaging structure (except for rudimentary components such as a keyboard and computer screen). In alternate embodiments, however, only a portion 101 of the entire computing system 100 is largely within a single "box" leaving sophisticated components (such as storage device 109) outside the single package environment 101. For example, in server applications, storage device 109 is often implemented as a "high performance" storage device such as a redundant array of inexpensive disk drives (often referred to as a "RAID box"). "Archival" storage devices capable of storing massive amounts of information (e.g., tape drives) are frequently employed as well.

Note that some form of "translation" between the communication protocol used by the system bus 103 (e.g., the communication protocol defined by the PCI standard); and, the communication protocol used by the storage device 109 (as used over communicative interface 108) often exists. For example, recent non volatile storage devices have been designed to use a communication protocol referred to as "IDE" or "Parallel ATA" for those applications where the storage device bridge 107 was within the primary package of the computing system. Often, higher performance storage interface technologies (such as "Fibrechannel" or "SCSI") are used to communicate with separate but attached storage devices over interface 108. Regardless, the storage device interface bridge 107 is often viewed as a unit that translates between the communication protocol used by the system bus 103 (e.g., a "PCI" bus in a Personal Computer (PC)) and the communication protocol used by the storage device over interface 108 (e.g., "Parallel ATA" or "Fibrechannel").

Parallel ATA has enjoyed widespread implementation. However, as the roots of Parallel ATA are presently over 15 years old, the Parallel ATA protocol is being pushed by continuing advances in computing speed to the point where a new, more efficient replacement protocol is being sought. One such replacement protocol is being referred to as "Serial ATA". Serial ATA is considered to be a more suitable storage device protocol for future computing system architectures because it is being designed so as to maintain lower pin counts and voltages; and, can entertain higher speeds simply by increasing clock speed. As Serial ATA represents a new storage device protocol capable of higher performance, the Serial ATA approach may also be able to displace a portion of the multiuser storage attachment technologies currently addressed by Fibrechannel or SCSI. At the time of filing, a publicly available version of the Serial ATA standard could be found in "Serial ATA: High Speed Serialized AT Attachment", Rev. 1.0, published by the Serial ATA Workgroup and dated Aug. 29, 2001.

BRIEF DESCRIPTION OF THE DRAWINGS

The present invention is illustrated by way of example and not limitation in the figures and accompanying drawings, in which like references indicate similar elements, and in which.

DETAILED DESCRIPTION

Given that Serial ATA is an emerging interface technology targeted for storage devices, opportunities presently exist with respect to enhancing its utility. For example, referring to FIG. 2, the following discussion will present an architectural overview for queuing commands at a device that communicates over a Serial ATA interface. Here, for example, a storage device 209 (e.g., a RAID box, standard magnetic hard drive or CD ROM drive, etc.) may be designed to enqueue a plurality of commands from the CPU 202. Recognizing that storage devices mostly perform READ operations in order to retrieve data from the storage resource 210 where the desired information is actually located (e.g., a particular hard drive disk track) and/or WRITE operations in order to store data to a specific desired storage resource 210 location, a storage device 209 having the ability to enqueue commands should allow for more efficient overall computing system operation.

For example, accepting and enqueuing multiple READ and/or WRITE commands from a CPU 202 allows a storage device 209 to selectively "pick and choose" the order of execution of its commands (e.g., where the order of execution is different that the order in which the commands were received). The selective picking and choosing of commands on the part of a storage device 209 allows the storage device 209 to operate more efficiently. For example, by selectively choosing to execute a series of commands (e.g., in an order that is departs from the strict order in which commands were received) that invoke a specific disk drive track or region, the average access time for a disk drive can be reduced; which, in turn, from the perspective of the user(s) of the disk drive, corresponds to faster disk drive performance. In order to entertain command queuing in an environment that uses Serial ATA between a device 209 and a CPU 202: 1) a queue 225 should be located at the device 209; and, 2) the communication protocol between the device 209 and the device interface bridge 207 should be workable with the Serial ATA specification.

Figure 1:
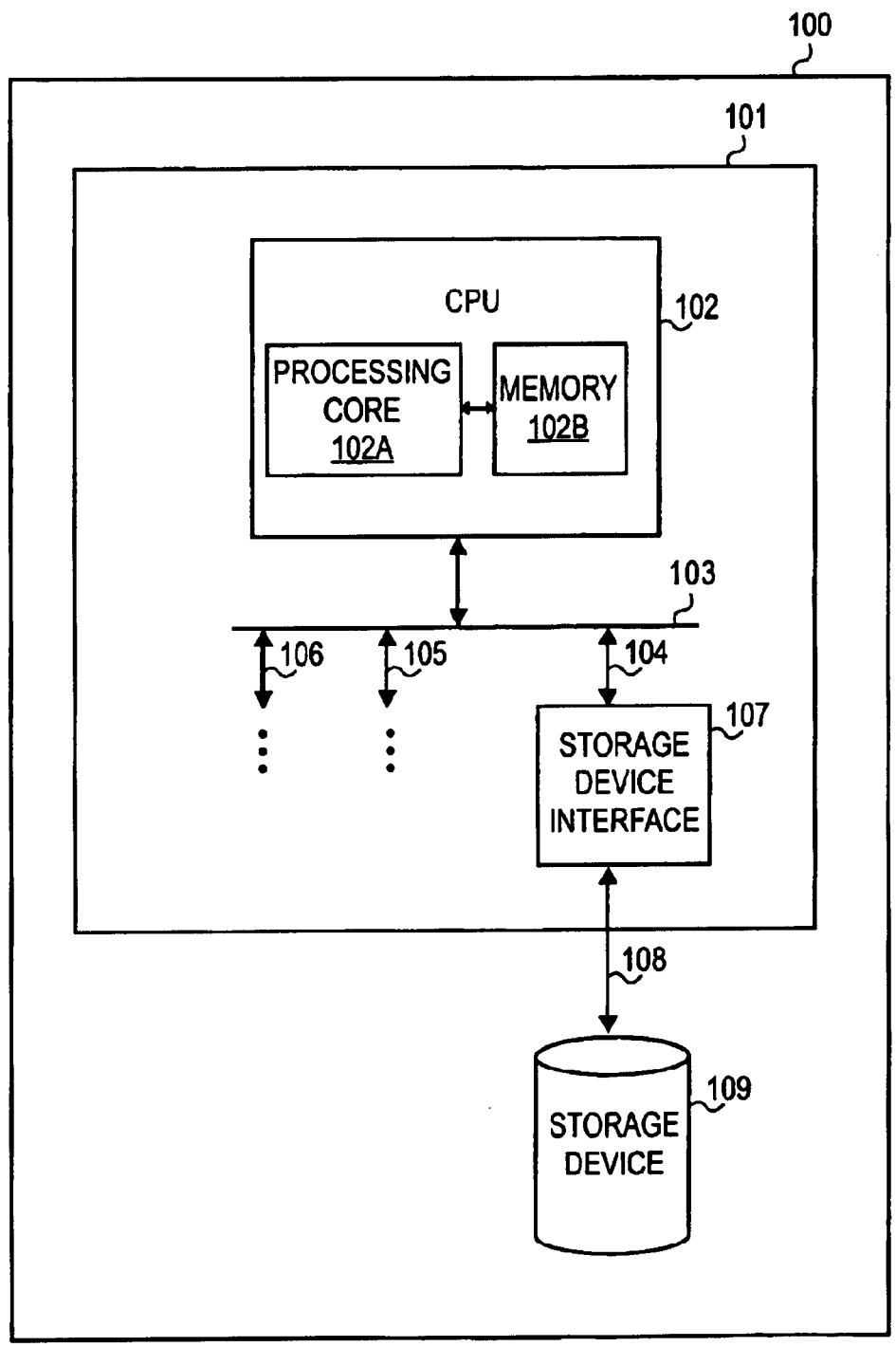
FIG. 1 shows an embodiment of a computing system architecture.
Figure 2:
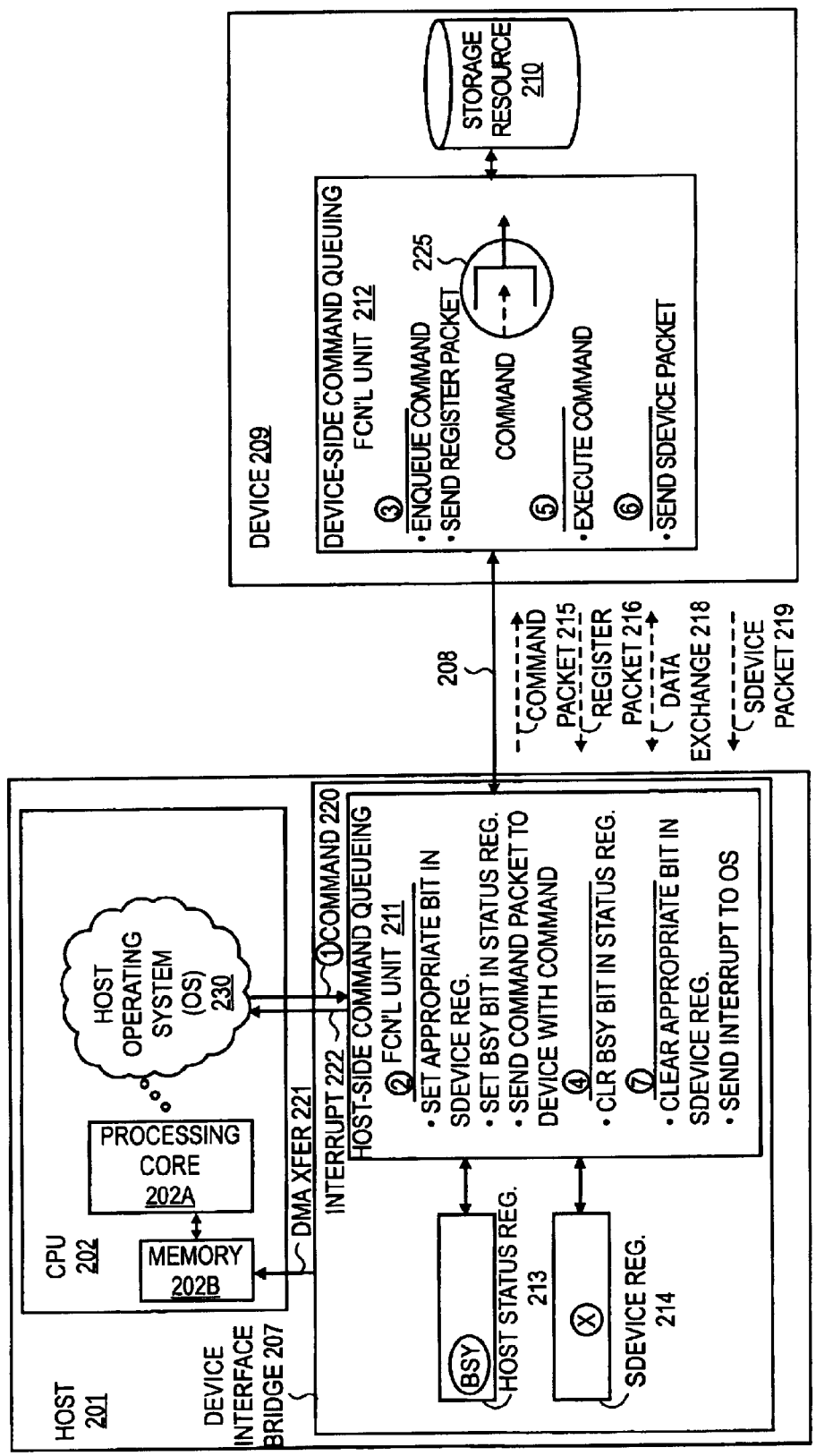
FIG. 2 relates to an approach for command queuing within a Serial ATA environment.

Note that the device interface bridge 207 of FIG. 2 approximately corresponds to the device interface bridge 107 of FIG. 1; and, the device interface 208 of FIG. 2 roughly corresponds to the device interface 108 of FIG. 1. As such, interface 208 may be viewed as a Serial ATA interface 208. Moreover, because the device 209 may remotely attached to the main system package or may be integrated within the main computing system package—the components on the side of the Serial ATA interface opposite to the device 209 are referred to as "host-side" components (noting that the "host" 201 of FIG. 2 roughly encompasses the functionality surrounded by region 101 of FIG. 1). Here, the host side components include the CPU 202 (which, in turn, includes a processing core 202a and memory 202b) as well as the device interface bridge 207. Note that, for simplicity, the system bus has not been drawn in FIG. 2.

In order to implement command queuing with Serial ATA, a "host-side" command queuing functional unit 211 exists on the host-side of the interface 208; and, a "device-side" command queuing functional unit 212 exists on the device side of the interface 207. The host-side and device-side command queuing functional units 211, 212 are responsible for implementing command queuing in a fashion that is workable with the Serial ATA functional specification(s).

Here, it is appropriate to discuss various implementations of the "hostside" command queuing functional unit 211. As a spectrum of different computing systems exist, it is useful to describe some possible implementations of the "host-side" command queuing functional unit 211 in at least some of the different computing systems that presently exist. The depiction of FIG. 2 corresponds more closely to a mid-range or a high end system (e.g., a workstation, a server, etc.). According to the design of these systems, the device interface bridge 207 is able to manage the storage interface 208 with little (if any) help from the Operating System (OS) 230.

As such, the host-side command queuing functional unit 211 can be implemented with one or more semiconductor chips that are different than the chip (or chips) used to implement the processing core 202a (where, for example, one or more microprocessor chips are used to implement the processing core 202a). The one or more semiconductor chips may execute the host side command queuing related functions with dedicated hardware circuitry; or, alternatively, if the one or more semiconductor chips are implemented as some form of microprocessor or microcontroller, the host side command queuing functions may be performed as some form of software routine. Further still, the host side command queuing functions may be executed partially in hardware or partially in software (e.g., through the combined efforts of non CPU microprocessor/microcontroller software and dedicated hardware circuitry).

With respect to lower end computing systems (e.g., Personal Computers (PCs)), the device interface bridge 207 and the CPU 202 may be merged to some degree. As such, according to this form of implementation, the host side command queuing functions may be executed by the processing core 202a (e.g., as one more device drivers for the device interface bridge 207 that are installed into the computing system's operating system software (and can therefore be viewed as part of the OS 230). Here, using the processing power of the CPU 202 to at least help in the performance of the host side command queuing functions typically allows for a less expensive implementation as compared to a high end system.

The term "host side command queuing function unit", "host side command queuing functional unit", and the like should be understood to encompass at least any of the implementations described above (e.g., dedicated hardware, combination of dedicated hardware and non-CPU software, non-CPU software alone, some CPU software, etc.). Note that, regardless of the type of system that applies, because the CPU 202 is responsible for executing the Operating System (OS) software 230 of the computing system, the OS software 230 may be viewed as being part of the CPU 202. Here, as the application software supported by the OS 230 (or the OS 230 itself) may require information stored by the device 209 or may wish to store information that should be stored into the device 209, a READ or WRITE command 220 destined for the device 209 may often be viewed as being issued by the OS 230 of the computing system. In other instances, a READ or WRITE command destined for the device may be issued by some other device or operational entity.

According to various embodiments, in response to a command from the OS 230 (or other function that uses or oversees interface 208), the host side command queuing functional unit 211: 1') sets an appropriate bit in an SDevice register 214; 2) sets a BSY bit within a host status register 213; and, 3) sends a command packet to the device 209 over the Serial ATA interface 208.

The host status register 213 and the BSY bit are defined by the Serial ATA standard. The BSY bit is observed by the OS 230 (or other function that uses or oversees interface 208) and, according to the Serial ATA standard, indicates whether or not the device 209 is busy executing a command. However, according to a command queuing technique wherein additional commands may be entertained by the device 209 even though previously issued commands remain enqueued and un-executed at the device 209, the BSY bit takes a different meaning. In this case, the BSY bit indicates whether or not the device 209 is willing to accept another command.

That is, in the existing Serial ATA approach, the BSY bit is set (e.g., set to a "1") upon issuance of a command is issued by the OS 230 (or other function that uses or oversees interface 208); and, is not reset or cleared (e.g., set to a "0") until after the command has been fully executed by the device. According to the queued command approach, however, the BSY bit is set as part of the process of successfully sending and enqueuing a command at the device 209. Upon the successful enqueuing of a command, however, the BSY bit is reset/cleared so as to indicate that another command is ready to be received. The OS 230 (or other function that uses or oversees interface 208), consistent with both "regular" Serial ATA and Serial ATA with command queuing, observes the BSY bit of the host status register and understands that additional commands should not be issued until the BSY bit is cleared.

Given that the device 209 can entertain and enqueue multiple commands, the depth of the queue 225 as well as some form of "command tracking" may be appropriate. Here, as queue depth corresponds to how many commands a queue can hold until it is "full", the queuing command functional units 211, 212 should not entertain additional commands during those instances where the queue is "full" with commands to be executed. Furthermore, given that multiple commands may be "outstanding", a strategy for identifying which commands have been successfully executed and which commands have yet to be successfully executed (i.e., "command tracking") may also be useful.

Accordingly, an SDevice register 214 may be used to help support both of these functions. In an embodiment, each command is "tagged" by the OS 230 (or other function that uses or oversees interface 208) with one of a plurality of N different reference numbers where N is the depth of the queue 225. In a further embodiment, N=32 (i.e., the queue 225 can hold 32 different commands); and, each command must be tagged with a reference number between 0 and 31 inclusive. Thus, for example, a first command may be tagged with reference number "0", a second command may be tagged with reference number "1", etc., up to a thirty second command being tagged with a reference number "31". The SDevice register 214 is designed so that a status can be separately indicated for each of the N different reference numbers. For example, continuing with the example where N=32, the SDevice register 214 may be implemented with the 32 different "one hot" encoded bits where, for each of the 32 different bits, a "0" indicates that the reference number is not currently assigned to an outstanding command; and, a "1" indicates that the reference number is currently assigned to an outstanding command.

Overfilling of the device queue 225 can therefore be substantially avoided by designing any functional unit that is configured to send a command to the device (e.g., the OS 230 or other function that uses or oversees interface 208): 1) to observe the SDevice register 214; and, 2) to only tag a command with a reference number whose SDevice register status indicates a "0". Thus, again continuing with the approach where N=32, if each of the 32 bits represented within the SDevice register 214 have a status of "1", the OS 230 (or other function that uses or oversees interface 208) will understand that 32 different commands are already outstanding and that, as a result, no further commands should be issued. Upon the successful completion of a command, as described in more detail further below, the bit within the SDevice register 214 that corresponds to the reference number that the just successfully completed execution was tagged with will be changed from a "1" to a "0" (i.e., "cleared").

As such, the offered load to the queued command system will be appropriately regulated by the entity issuing commands for the device 209 (e.g., the OS 230 or other function that uses or oversees interface 208) because, from a state where all bits within the SDevice register 214 (that are representative of a reference number status) have a value of "1", upon indication of the next command to be successfully executed (e.g., the command having a reference number of "x" where x is any number between 0 and 31 inclusive), the bit for its corresponding reference number within the SDevice register 214 (e.g., bit x) will be reset/cleared from a "1" to a "0" (so as to represent that there is no longer an outstanding command having reference number "x").

Consequently, should the OS 230 (or other function that uses or oversees interface 208) immediately have another command "at the ready" to issue to the device 209, and being designed to only use reference numbers having a status of "0" within the SDevice register 214, the OS 230 (or other function that uses or oversees interface 208) will issue another command with reference number "x" (which consequently causes reference number "x" to be set back to a "1"). Note that the OS 230 (or other function that uses or oversees interface 208) may be further restricted so as to only issue a command if the BSY bit is clear too (so as to issue commands only when an available reference number exists and the interface 208 is free to transport the command). Upon the sending of the new command that is tagged with a reference number of "x", the OS 230 (or other function that uses or oversees interface 208) will then have to wait until another pending command is successfully executed before launching another command.

FIG. 2 outlines an embodiment of the overall process in more detail. Upon reception of a command 220 (e.g., from the OS 230 or other function that uses or oversees interface 208) that is properly tagged (e.g., with number "x"), the host-side command queuing functional unit 211 will: 1) set the xth (or the (x+1)th) bit in the SDevice register 214; 2) set the BSY bit in the host status register 213 to indicate that the Serial ATA interface 208 is busy sending and enqueuing this command to the device 209; and, 3) send a "command" packet 215 to the device 209 having the command. In an embodiment, the command packet 215 includes the reference number that has been tagged with the command. Upon reception of the command packet 215, the device-side command queuing functional unit 212 will: 1) enqueue the command in the queue 225; and 2) send a "Register" packet 216 back to the host-side command queuing functional unit 211.

In response to the reception of the Register packet 216, the host-side queuing command function 211 will clear the BSY bit in the host status register 213 (to indicate to the OS 230 or other function that uses or oversees interface 208) that the interface 208 is free (e.g., to send another command). At this point the command (e.g., a READ command or a WRITE command) is executed as some form of data exchange 218 between the host 201 and the device 209. Note that the device 209 may be configured to execute the command: 1) ahead of one or more commands that have already been entered in the queue 225; and/or 2) after one or more commands that will be subsequently entered in the queue 255 "behind" the command.

After the command is successfully executed by the device 209, the device side command queuing functional unit 212 sends an SDevice packet 219 to the host-side command queuing functional unit 211. In response to the reception of the SDevice packet, the host-side command queuing functional unit 211, resets (or "clears") the appropriate bit in the SDevice register 214 so as to indicate to the OS 230 (or other function that uses or oversees interface 208) that the command has been successfully executed and its reference number (x) is now available for tagging with another command. In a further embodiment, an interrupt 222 may be sent to the OS 230 (or other function that uses or oversees interface 208) to inform the OS 230 (or other function that uses or oversees interface 208) of the command's completion.

Note that in various embodiments the SDevice packet 219 indicates the reference number (e.g., x) for the command in some fashion (e.g., the SDevice packet 219 includes N one hot encoded bits) so that the host side functional unit 211 can confirm which command has been executed. Here, a single SDevice packet 219 can also be configured to indicate that more than one command has been completed (e.g., if commands "4" and "12" have been completed, an SDevice packet 219 is prepared that indicates both command "4" and command "12" have been completed (e.g., by setting the $4^{th}$ and $12^{th}$ bits within a field of the SDevice packet 219 that is representative of the SDevice register)). Note also that if the CPU 202 does not immediately respond to the interrupt 222 that is raised commensurate with a bit being cleared in the SDevice register 214; and, if in the meantime, a series of SDevice packets are sent (to indicate multiple commands have been completed), the SDevice register 214 will aggregate the cleared bits. As such, when the CPU 222 is able to respond to the original interrupt 222, the most current status regarding command completion (i.e., the aggregated status) will be observed from the SDevice register 214.

A "Register" packet 216 is a packet that can be used to clear the BSY bit within the host status register 213 by the device 209. As such, in the embodiment of FIG. 2, in order to indicate that the interface 208 is free (e.g., to transport a command), a Register packet 216 is employed. An "SDevice" packet 217 is a packet having reserved space that can map to a register on the host side of the interface (i.e., in this case, the SDevice register 214). Here, as described above, the SDevice register 214 maintains the status bits for the various command reference numbers. As such, a Register packet 216 is used to control the BSY bit on the host side of the interface 208; and, an SDevice packet 217 is used to control the content of the SDevice register (at least with respect to the command reference status bits) on the host side of the interface 208.

Note that the device 209 may often times be commanded to execute a "DMA" transfer by the OS 230 (or other function that uses or oversees interface 208). A DMA transfer (which stands for Direct Memory Access transfer) is a transfer where the device 209 is able to directly move data (e.g., via the use of tags): 1) to a region of host memory 202b after it has been read from the storage resource 210; or, 2) from a region of host memory 202b before it is stored into storage resource 210. By allowing the device 209 to move data as described above, the device 209 is able to effectuate data transfers between host memory 202b and storage resource 210. As the processing core 202a is for the most part left out of the transaction, a DMA allows for the transfer of information within the computing system (e.g., between memory 202b and storage resource 210) without incurring substantial overhead (in the form of executions performed by the processing core 202a that divert the processing core's attention from more substantive tasks).

In a Serial ATA environment, if a command executed by the device 209 involves a DMA transfer, the device may use a "first party mechanism". According to a first party mechanism approach, the device 209 will send a DMA_Setup packet to the device interface bridge 207. In response, the device interface bridge 207 will setup a host DMA engine. Setting up the host DMA engine on the part of the device interface bridge 207 involves selecting a correct "scatter/gather" table for the particular command which corresponds to the selection of the proper host memory 202b region for a subsequent DMA transfer. Here, the DMA_Setup packet may include the reference number that the command was tagged with by the OS 230 (or other function that uses or oversees interface 208) so that the proper table can be retrieved. As such, in an embodiment, the device interface bridge 207 is designed to pre-establish a "correct" scatter/gather table for a DMA command (that is referenced by the command's reference number) as part of its response to receiving a DMA command from the OS 230 (or other function that uses or oversees interface 208). As such, when the device eventually responds with a DMA_Setup packet for the command, the bridge 207 has already prepared the proper table and need only look to the contents of the DMA_Setup packet to obtain the proper table.

Figure 3:
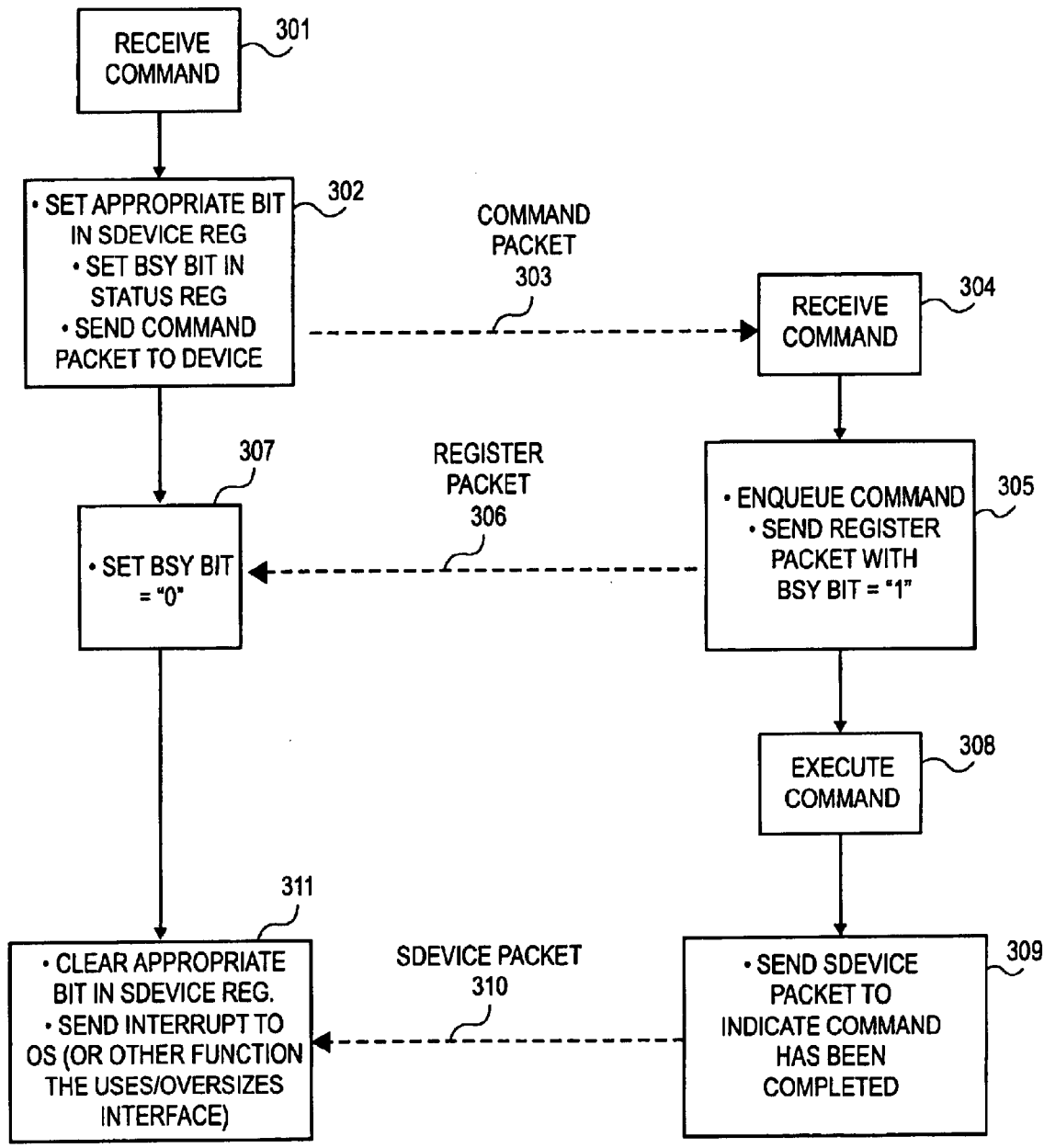
FIG. 3 shows a methodology for command queuing within a Serial ATA environment.

FIG. 3 shows an embodiment of a methodology that describes an approach for Serial ATA command queuing in more detail. According to the approach of FIG. 3, a command is received 301 that is tagged with a reference number. In response to the reception of the command, the host side command queuing functional unit 302: 1) sets an appropriate bit in an SDevice register that corresponds to the reference number included with the command; 2) sets the BSY bit in the host status register (e.g., to a "1") to indicate that the interface is busy; and, 3) sends a "command" packet 303 to the device side command queuing function that includes the reference number of the command.

In response to the reception 304 of the "command" packet 303, the device side command queuing function 305: 1) enqueues the command; and, 2) sends a register packet 306 having its BSY bit set to "0".

Upon reception of the register packet 306, the host side command queuing functional unit 307: 1) interprets the BSY bit as an instruction to clear the BSY bit (that is, as the host status register BSY bit=1 prior to reception of the register packet 306, the reception of the register packet 306 will cause the host side queuing function to change the status of the BSY bit from a "1" to a "0").

After execution of the command 308 (which may involve a DMA transfer; and, noting the device may arrange the ordering of the commands it receives), the device side queuing functional unit sends 309 an SDevice packet 310 to the host-side queuing functional unit that causes the host-side queuing function 311 to: 1) clear the bit for the command's reference number within the SDevice register 214; and, 2) send an interrupt to the OS 230 (or other function that uses or oversees interface 208).

It is important to note that although the "device" described herein has been limited to a storage device, those of ordinary skill will be able to appreciate that the term device may be used to describe any apparatus that receives and executes commands. Furthermore, although the term "host side command queuing functional unit" has been described as being capable of implementation in hardware (e.g., one or more semiconductor chips), software or a combination of hardware and software; it should be understood that the term "device side command queuing functional unit" may also be implemented in hardware, software or a combination of hardware and software.

In addition, for those implementations that involve software, the instructions to perform the methods that are implemented in software may be stored on a computer-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals and digital signals).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
   a) receiving a command, said command tagged with a reference number;
   b) sending said command and said reference number over a Serial ATA interface to a device and setting a bit in order to indicate said Serial ATA interface is busy and altering a field of information to reflect that said reference number is presently unavailable for tagging to another command;
   c) receiving information from said Serial ATA interface that was sent from said device, said information indicating that said bit should be cleared in order to indicate that said Serial ATA interface is no longer busy and clearing said bit so as to indicate that said Serial ATA interface is no longer busy; and
   d) receiving additional information from said Serial ATA interface that was sent from said device, said additional information indicating that said field of information should again be altered to reflect that said reference number is presently available for tagging to another command because said command has been executed and altering said field of information to reflect that said reference number is presently available for tagging to another command.

2. The method of claim 1 wherein said bit is a BSY bit within a host status register.

3. The method of claim 1 wherein said reference number is one reference number out of a plurality of reference numbers, said field of information further comprising one bit for each said reference numbers, each of said reference numbers for tagging to different commands, said field if information within an SDevice register.

4. The method of claim 1 wherein said information is sent within a Register packet.

5. The method of claim 1 wherein said additional information is sent within an SDevice packet.

6. The method of claim 1 further comprising sending an interrupt message to an entity that sent said command, as a consequence of said additional information having been received, so that said entity can recognize that said reference number is presently available for tagging to another command.

7. The method of claim 1 wherein said command is a READ command.

8. The method of claim 1 wherein said command is WRITE command.

9. The method of claim 1 further comprising receiving a DMA₁₃ Setup packet after said receiving of said information but prior to said receiving of said additional information, said DMA_Setup packet further comprising said reference number.

10. The method of claim 9 further comprising setting up a DMA engine in response to said receiving of said DMA_Setup packet.

11. The method of claim 10 wherein said setting up a DMA engine further comprises retrieving a scatter/gather table, said scatter/gather table referenced by said reference number.

12. The method of claim 11 further comprising setting up said scatter/gather table in response to said receiving of said command.

13. A method, comprising:
   a) receiving a packet having a command and a reference number, said packet received from a Serial ATA interface that is coupled to a host;
   b) queuing said command in a queue and sending information to said host over said Serial ATA interface, said information indicating that a bit within said host should be cleared in order to indicate that said Serial ATA interface is no longer busy;
   c) executing said command; and
   d) sending additional information to said host over said Serial ATA interface, said additional information indicating that a field of information should be altered to reflect that said reference number is presently available for tagging to another command because said command was executed.

14. The method of claim 13 wherein said information is sent within a Register packet.

15. The method of claim 13 wherein said reference number is one reference number out of a plurality of reference numbers, said field of information further comprising one bit for each said reference numbers, each of said reference numbers for tagging to different commands, said field if information within an SDevice register within said host.

16. The method of claim 15 wherein said additional information is sent within an SDevice packet.

17. The method of claim 13 wherein said executing further comprises executing said command before another command is executed, said other command having been received before said command was said received.

18. The method of claim 13 wherein said executing further comprises executing said command after another command is executed, said other command having been received after said command was said received.

19. The method of claim 13 wherein said command is a READ command.

20. The method of claim 13 wherein said command is a WRITE command.

21. The method of claim 13 further comprising sending a DMA_Setup packet after said receiving of said packet in order to commence said execution of said command, said DMA_Setup packet further comprising said reference number.

22. An apparatus, comprising:
   a) a host side functional unit that communicates over a Serial ATA interface;
   b) a host status register, said host side functional unit to set a bit within said host status register in response to reception of a command and a reference number for said command, said command to be sent over said Serial ATA interface, said setting of said bit to indicate said Serial ATA interface is busy; and
   c) an SDevice register to present a field of information, said field of information to indicate a status for each one of a plurality of commands, said host side functional unit to set said command's status, in response to said reception, to indicate said command is both outstanding and unexecuted.

23. The apparatus of claim 22 further comprising a storage device that is communicatively coupled to said host side functional unit.

24. The apparatus of claim 23 wherein said storage device and said host side functional unit reside within the same computing system package.

25. The apparatus of claim 24 wherein said computing system is a Personal Computer (PC).

26. The apparatus of claim 25 wherein said host side functional unit is at least partially implemented with software that is executed by said PC's Central Processing Unit (CPU).

27. The apparatus of claim 23 wherein said storage device resides outside a computing system package that said host side functional unit resides within.

28. The apparatus of claim 27 wherein said computing system is a server.

29. The apparatus of claim 27 wherein said computing system is a workstation.

30. The apparatus of claim 27 wherein said storage device is a RAID box.

31. The apparatus of claim 22 wherein said host side functional unit is implemented with a semiconductor chip.

32. The apparatus of claim 22 wherein said host side functional unit is implemented with a software program.

33. The apparatus of claim 22 wherein said host side functional unit is further configured to clear said bit in response to a register packet being received at said Serial ATA interface.

34. The apparatus of claim 22 wherein said host side functional unit is also to change said command's status, upon receipt of an SDevice packet from said Serial ATA interface, to indicate said command has been executed.

35. A machine readable medium having stored thereon a sequence of instructions which when executed by a processor or a controller, cause said processor or controller to implement a method, said method comprising:
   a) receiving a command, said command tagged with a reference number;
   b) sending said command and said reference number over a Serial ATA interface to a device and
   setting a bit in order to indicate said Serial ATA interface is busy and
   altering a field of information to reflect that said reference number is presently unavailable for tagging to another command;
   c) receiving information from said Serial ATA interface that was sent from said device, said information indicating that said bit should be cleared in order to indicate that said Serial ATA interface is no longer busy and clearing said bit so as to indicate that said Serial ATA interface is no longer busy; and
   d) receiving additional information from said Serial ATA interface that was sent from said device, said additional information indicating that said field of information should again be altered to reflect that said reference number is presently available for tagging to another command because said command has been executed and
   altering said field of information to reflect that said reference number is presently available for tagging to another command.

36. The machine readable medium of claim 35 wherein said bit is a BSY bit within a host status register.

37. The machine readable medium of claim 35 wherein said reference number is one reference number out of a plurality of reference numbers, said field of information further comprising one bit for each said reference numbers, each of said reference numbers for tagging to different commands, said field if information within an SDevice register.

38. The machine readable medium of claim 35 wherein said information is sent within a Register packet.

39. The machine readable medium of claim 35 wherein said additional information is sent within an SDevice packet.

40. The machine readable medium of claim 35 further comprising sending an interrupt message to an entity that sent said command, as a consequence of said additional information having been received, so that said entity can recognize that said reference number is presently available for tagging to another command.

41. The machine readable medium of claim 35 wherein said command is a READ command.

42. The machine readable medium of claim 35 wherein said command is WRITE command.

* * * * *

UNITED STATES PATENT AND TRADEMARK OFFICE
CERTIFICATE OF CORRECTION

PATENT NO. : 6,917,992 B2
DATED : July 12, 2005
INVENTOR(S) : Grimsrud et al.

It is certified that error appears in the above-identified patent and that said Letters Patent is hereby corrected as shown below:

Column 9,
Line 50, delete "$DMA_{13}$" and insert -- $DMA\_$ --.

Signed and Sealed this

Sixth Day of September, 2005

JON W. DUDAS
*Director of the United States Patent and Trademark Office*